(12) United States Patent
Hernette et al.

(10) Patent No.: US 7,575,288 B2
(45) Date of Patent: Aug. 18, 2009

(54) SYSTEM FOR CONTROLLING THE STATE AND OPERATION OF A MOTOR VEHICLE

(75) Inventors: Vincent Hernette, Paris (FR); Francois Bailleux, Val d'Albian (FR); Vincent Abadie, Sartrouville (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 0 days.

(21) Appl. No.: 10/544,209

(22) PCT Filed: Feb. 6, 2004

(86) PCT No.: PCT/FR2004/000278

§ 371 (c)(1),
(2), (4) Date: Jan. 12, 2006

(87) PCT Pub. No.: WO2004/071835

PCT Pub. Date: Aug. 26, 2004

(65) Prior Publication Data

US 2006/0202554 A1 Sep. 14, 2006

(30) Foreign Application Priority Data

Feb. 7, 2003 (FR) .................................. 03 01487

(51) Int. Cl.
*B60T 8/00* (2006.01)

(52) U.S. Cl. ....................................... 303/192

(58) Field of Classification Search ................. 303/191, 303/192
See application file for complete search history.

(56) References Cited

U.S. PATENT DOCUMENTS

| 4,591,213 | A * | 5/1986 | Rapoport ..................... 303/191 |
| 6,019,436 | A * | 2/2000 | Siepker ........................ 303/13 |
| 6,199,964 | B1 * | 3/2001 | Ota et al. ..................... 303/192 |
| 2004/0011610 | A1 * | 1/2004 | Witzler et al. ............... 188/265 |
| 2005/0173977 | A1 * | 8/2005 | Fischer ........................ 303/89 |

FOREIGN PATENT DOCUMENTS

| DE | 34 40 081 | 5/1986 |
| DE | 196 32 863 | 2/1998 |
| DE | 199 06 227 | 8/2000 |
| DE | 100 38 786 | 2/2002 |

* cited by examiner

*Primary Examiner*—Xuan Lan Nguyen
(74) *Attorney, Agent, or Firm*—Nicolas E. Seckel

(57) ABSTRACT

The invention relates to a system for controlling the state and operation of a motor vehicle. The system is characterized in comprising sensors (C1, C2, ... and CN) arranged on the vehicle and a control unit (35), receiving information from the different sensors and determining the state of the vehicle from said information and calculating the settings for braking transmitted to the dynamic (6) and static (7) breaking units, particularly allowing the vehicle to be maintained stationary when the speed thereof is zero. The invention finds application in the field of automobiles.

16 Claims, 3 Drawing Sheets

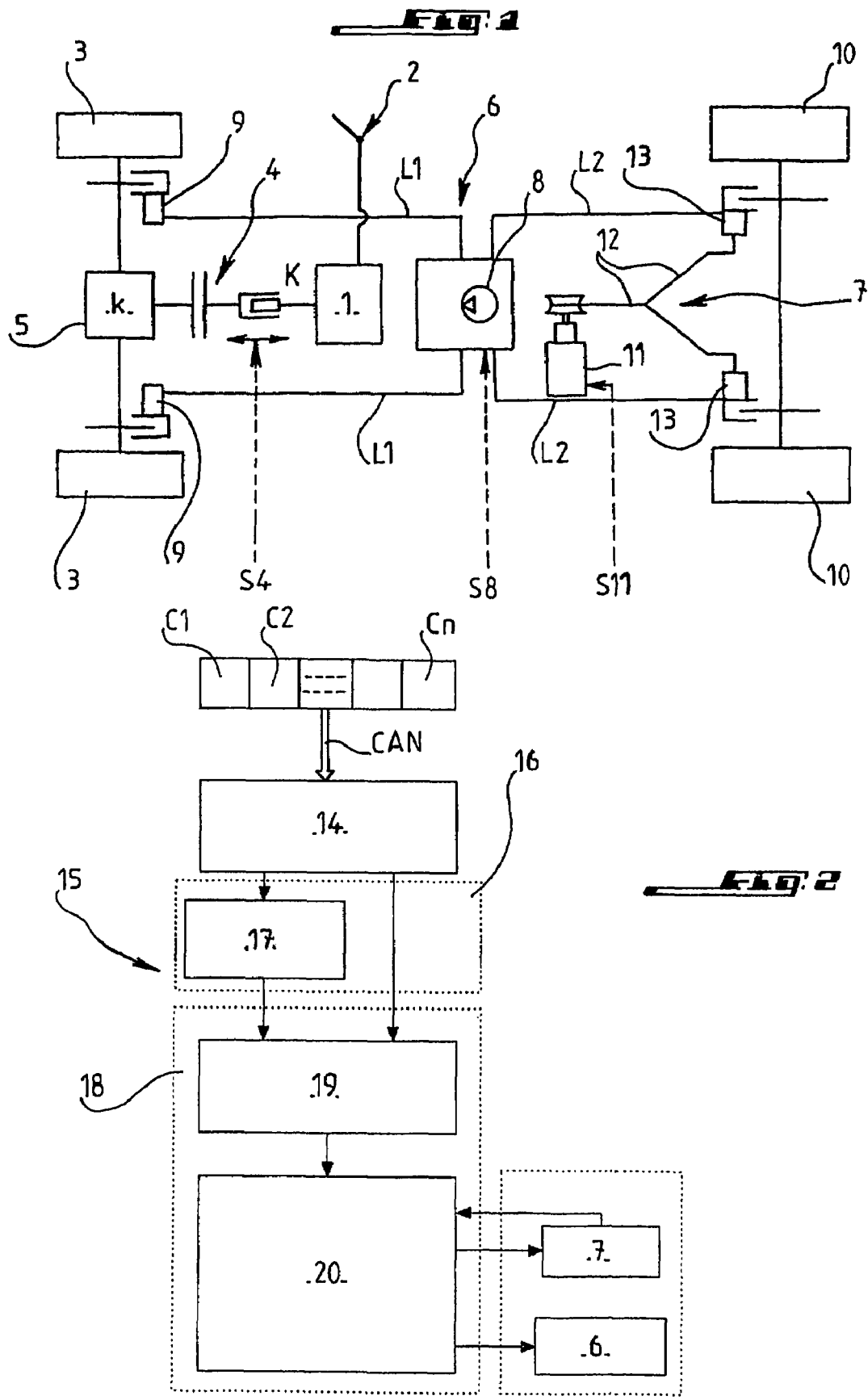

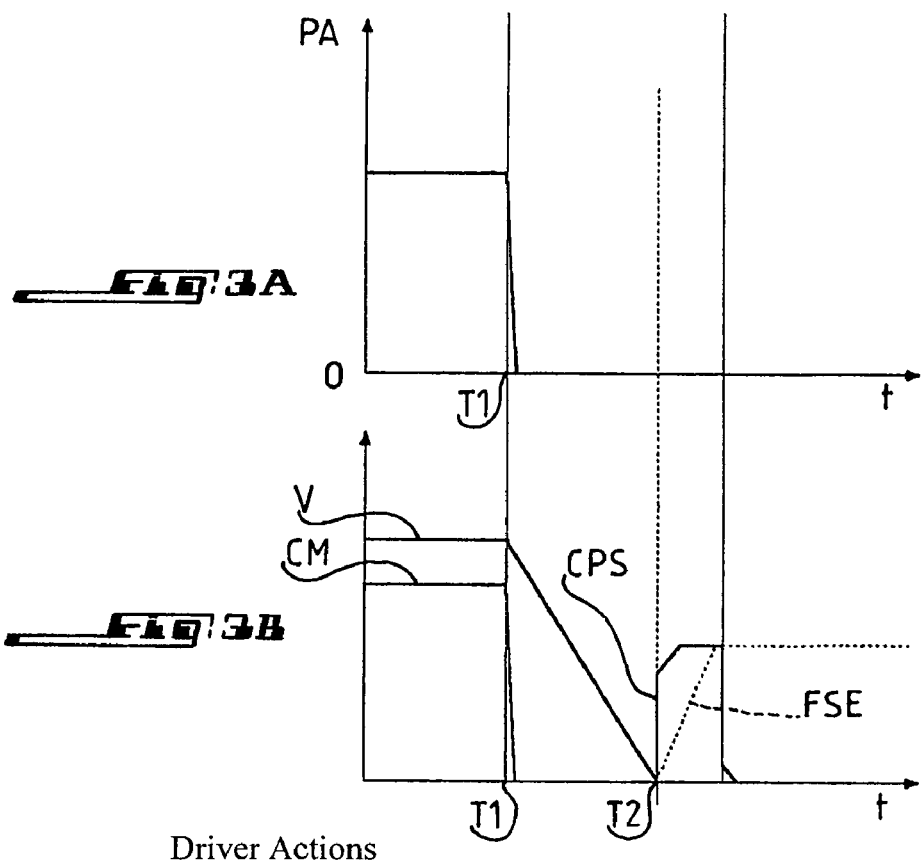
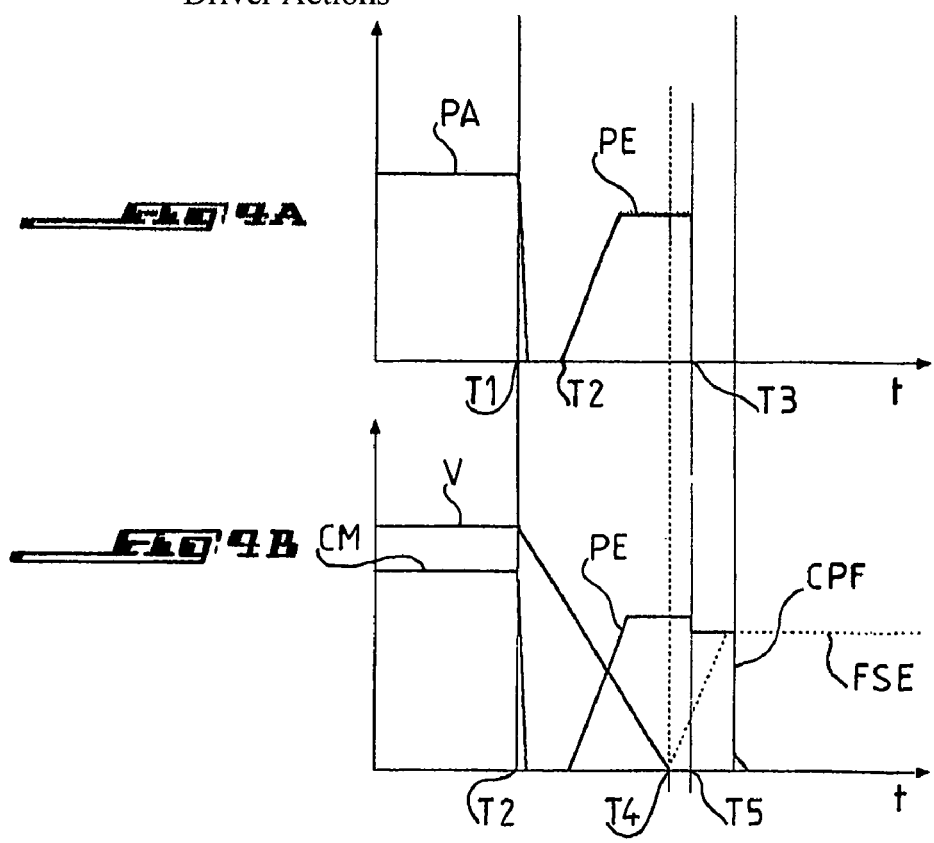
Driver Actions

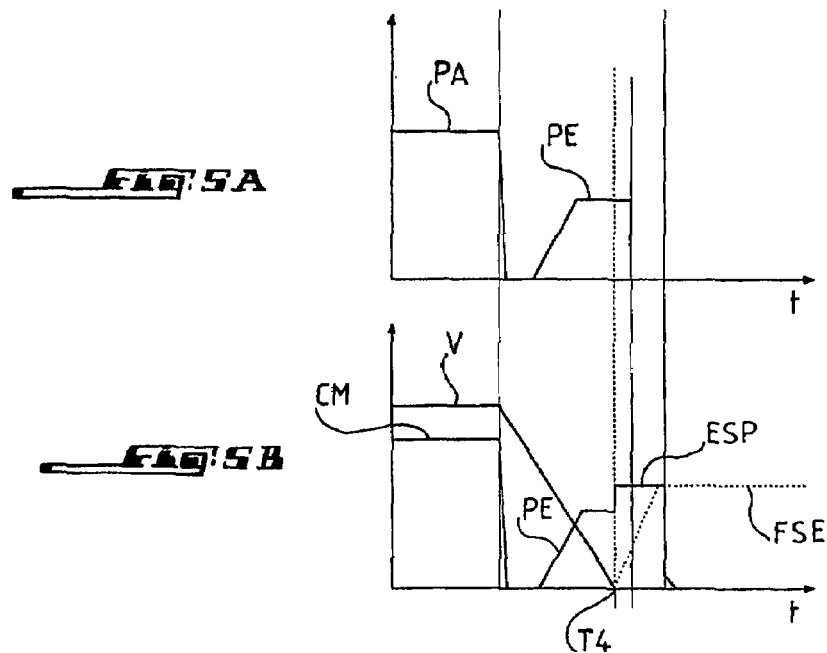
FIG.5A
FIG.5B
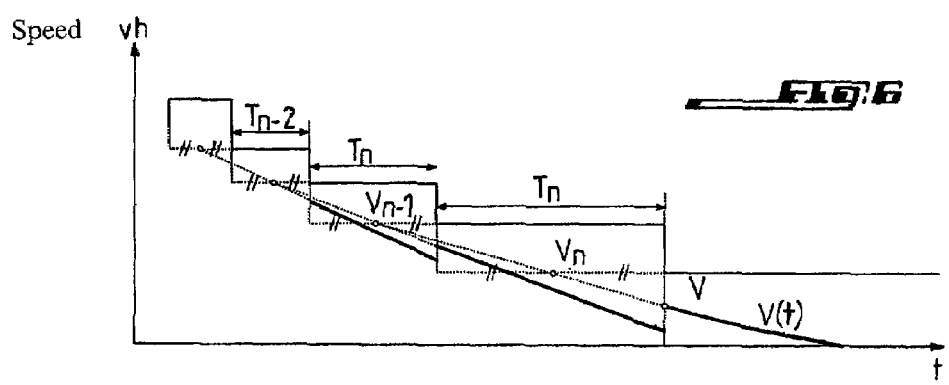
FIG.6
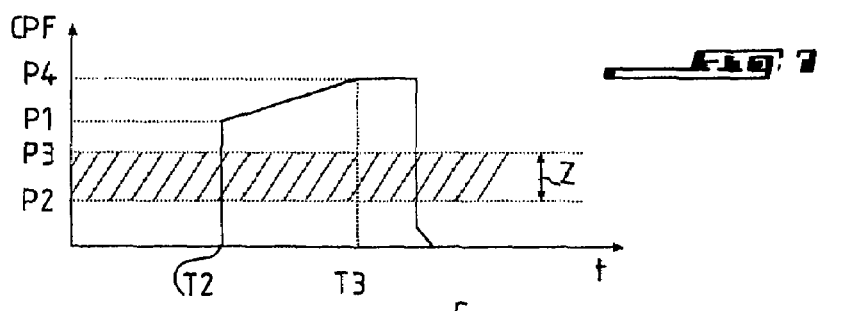
FIG.7
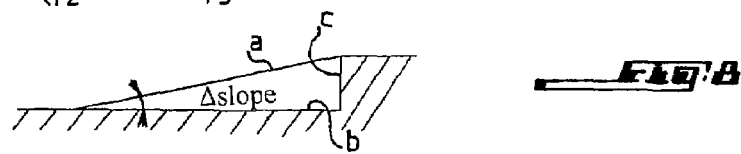
FIG.8

SYSTEM FOR CONTROLLING THE STATE AND OPERATION OF A MOTOR VEHICLE

BACKGROUND ART

The present invention concerns a system for controlling the state and operation of a motor vehicle.

It concerns more particularly a system for controlling and maintaining a motor vehicle in an immobilized state when its speed decreases until the vehicle is stopped, the vehicle being equipped with a dynamic braking device and a static braking device.

Motor vehicles are currently becoming increasingly automated with the objective of increasing the security and comfort of these vehicles.

However, this automation is limited for reasons of weight, cost, and/or layout difficulties.

Such is the case, for example, for a motor vehicle according to which the deceleration of the vehicle is ensured by the static breaking device that includes usually an electric geared motor driving at least an actuation cable of a parking brake acting on the rear wheels of the vehicle and a wheel anti-blocking device making it possible to dose the efforts in the actuation cable of the parking brake while monitoring the speed of the wheels. Such a known architecture is expensive because it is necessary to provide a static braking device that must have a good dynamics, i.e., a motor power capacity capable of generating the braking efforts in the actuation cable or cables within a very short time, for example, in less than 500 milliseconds.

SUMMARY OF THE INVENTION

An objective of the present invention is to eliminate the above drawbacks of known systems.

To this effect, the invention proposes a system for controlling the state and operation of a motor vehicle equipped with a dynamic braking device and a static braking device, and which is characterized in that it comprises a number of sensors on board the vehicle, such as, for example, a sensor of the longitudinal deceleration of the vehicle, at least one sensor of the rotation speed of one of the wheels of the vehicle, a sensor of the displacement of the wheels of the vehicle with respect to its body, and a sensor of the pressure of the master cylinder, a piloting device receiving information from the various sensors and adapted to determine, from this information, and, when appropriate, from the information representative of the states of the brake and acceleration pedals of the vehicle, the state of the vehicle, and to calculate braking orders transmitted to the dynamic and static braking devices, making it possible in particular to keep the vehicle immobilized as soon as its speed is zero, to restart the vehicle after it has stopped, and to trigger a controlled deceleration of the vehicle or to ensure a secure braking effect on the vehicle when it is in a stopped state.

The piloting device is adapted to immobilize the vehicle as soon as its speed is zero by blocking it through the simultaneous actuation of its dynamic braking device and its static braking device when the vehicle is located on a relatively steep slope, for example, of at least 20%.

Further, the piloting device is adapted to immobilize the vehicle as soon as its speed is zero by blocking through the actuation of its static braking device when the vehicle is located on a relatively gentle slope, for example, of less than 3%.

The piloting device makes it possible to determine the slope on which the vehicle is moving by calculating the difference between the value of the longitudinal deceleration of the vehicle provided by the sensor of longitudinal deceleration and the value of the longitudinal deceleration calculated from the sensor of the rotation speed of a wheel of the vehicle to determine a longitudinal deceleration shift value $\gamma_{longislope}$ and by calculating the slope according to the formula:

$$\text{slope}[\%] = 100 \times \tan\left\{\arcsin\left(\frac{\gamma_{longislope}}{g}\right)\right\}$$

The piloting device makes it possible to analyze the evolution of the calculated slope to verify its coherence with the distance covered by the vehicle in order not to take into account for immobilization of the vehicle a small distance covered by the vehicle for a calculated slope gap, by using the following formula:

where a is the wheel base of the vehicle, and
b is the distance covered by the vehicle.

$$\Delta\text{slope} = \text{Arccos}\left(\frac{b - \Delta b}{a}\right) - \text{Arccos}\left(\frac{b}{a}\right)$$

This piloting device calculates a correction of the longitudinal deceleration value provided by the corresponding sensor from the sensors of the front and rear wheel displacement with respect to the body of the vehicle according to the formula:

$$\gamma_{longisenscorr} = \gamma_{longisensor} - \sin\left(\arctan\left(\frac{Zfr - Zre}{a}\right)\right)$$

where $Z_{fr}$ is the front wheel displacement,
$Z_{re}$ is the rear wheel displacement, and
a is the vehicle wheel base.

The piloting device is adapted to calculate an optimized braking pressure order applied to the dynamic braking device as a function of the slope on which the vehicle is moving and of an estimation of the global braking effectiveness of the vehicle determined by the longitudinal deceleration of the vehicle for a given braking pressure resulting from a push on the braking pedal by the driver of the vehicle during the braking operations of the vehicle.

The piloting device optimizes the braking pressure order at a value just required to maintain the vehicle in a stopped state, increased by a multiplying security factor so that the braking pressure applied to the dynamic braking device is above the braking noise zone.

The dynamic braking device is activated by the piloting device so as to apply the braking order to the four wheels of the vehicle, and when the dynamic braking device is deactivated, the braking pressure falls brutally below the noise zone, then decreases more slowly until a zero value.

During a deceleration of the vehicle, the piloting device calculates a deceleration value from each of the sensors of the speed of the wheels of the vehicle according to the formula:

$$\gamma_{longiwheels} = 2\frac{2\pi R}{N} \times \frac{\frac{1}{Tn} - \frac{1}{Tn-1}}{Tn + Tn - 1}$$

where R is the outer radius of the wheel,

N is the number of tops by revolution of the sensors, and

Tn, Tn−1 are the past and present periods, respectively, of the square signal provided by the sensor, inversely proportional to the rotation speed of the wheel, the piloting device performing an average of the four longitudinal deceleration values calculated for the four wheels of the vehicle and calculating the vehicle speed from each calculated deceleration value according to the formula:

$$V(t) = \frac{2\pi R}{NTn} \times \gamma longiwheels \frac{Tn + t}{2}$$

where t is the time passed since the last upward front of the square signal of the sensor, and the piloting device performs an average of the four calculated vehicle speed values.

The static braking device comprises an electric geared motor driving at least a cable for actuation of a parking brake acting on the rear wheels of the vehicle and the piloting device calculates the tightening effort in the cable by determining the torque at the exit of the electric motor from the intensity of the electric current of the motor and the efficiency of its reducer.

The piloting device actuates the static braking device when the driver actuates the control switch of the latter and when the driver pushes simultaneously on the brake pedal, to ensure an emergency mode when the dynamic braking device is out of service.

The piloting device keeps the dynamic and/or static braking device activated if the driver brings the selector lever of the gear box to the dead center or neutral position when the vehicle is stopped and the piloting device does not activate any of the dynamic and static braking devices if the vehicle is stopped in the dead center or neutral position of this lever.

The piloting device applies to the dynamic braking device and/or to the static braking device a more important braking pressure order in the case where the vehicle has an overload signaled to the piloting device by a manual action of the driver, such as by pressing for a determined duration on a control switch of the static braking device.

BRIEF DESCRIPTION OF THE DRAWINGS

The invention will be better understood, and other objectives, characteristics, details and advantages of the invention will be more clearly apparent in the following explicative description made in reference to the annexed schematic drawings provided only as examples illustrative of an embodiment of the invention, and in which:

FIG. 1 is a schematic view illustrating components of a motor vehicle to which the system of the invention can be applied;

FIG. 2 shows in the form of a flowchart the architecture of the system of the invention making it possible to control the state of the operation of a motor vehicle equipped with a dynamic braking device and a static braking device;

FIGS. 3A and 3B show two chronograms illustrating the evolution as a function of time of signals when a vehicle is stopped in an uphill slope by releasing the acceleration pedal;

FIGS. 4A and 4B show two chronograms illustrating the evolution as a function of time of signals when the vehicle is stopped in an uphill slope with sufficient braking by the driver;

FIGS. 5A and 5B show two chronograms illustrating the evolution as a function of time of signals when a vehicle is stopped in an uphill slope with insufficient braking by the driver;

FIG. 6 shows a time diagram illustrating the calculation of the speed of the vehicle from periods of a sensor of the speed of a wheel of this vehicle;

FIG. 7 shows a time diagram illustrating the optimization of the appearance of a braking pressure order as a function of time applied to the dynamic braking device of the vehicle; and FIG. 8 is a schematic view explaining the coherence of a variation of a slope on which the vehicle is moving with respect to the distance covered by the vehicle.

DETAILED DESCRIPTION OF PARTICULAR EMBODIMENTS

Thus, the invention concerns a system for controlling the state and the operation of a motor vehicle moving in particular on a slope and which must be placed in a stable immobilized state.

The vehicle can be equipped with an automatic gear box or with a mechanical gear box with piloted clutch.

As shown on FIG. 1, the vehicle is equipped with an engine 1 controlled by an acceleration pedal 2.

The engine 1 develops an engine torque K whose integrality or of which a fraction k can be transmitted to the driving wheels 3 via a clutch 4 and a transmission system 5, wherein the clutch 4 can be constituted by a clutch that is automatically piloted by a signal S4.

The system of the invention applies to a vehicle equipped with a dynamic braking device 6 and a static braking device 7, wherein each of these devices can be controlled by a source of energy independent from the muscular energy of the driver.

Preferably, the dynamic braking device 6 comprises an electro-hydraulic pump 8 controlled by a signal S8 and capable of supplying pressurized braking liquid to receptors 9 of hydraulic brakes associated to the front driving wheels 3 and to the rear wheels 10, respectively, the connections from the pump 8 to the hydraulic brake receptors 9 and 13 associated to the driving wheels 3 and rear wheels 10 being shown at L1 and L2. The electro-valves connecting the pump 8 to the hydraulic brake receptors 9 and forming a known hydraulic modulator, are not shown for reasons of simplicity.

The static braking device 7 comprises an electric geared motor 11 controlled by a signal S11 and which is capable of driving at least a cable 12 adapted to actuate a parking brake 13 acting on the rear wheels 10 of the vehicle.

According to the invention, the system for controlling the state and operation of the vehicle comprises generally, as shown on FIG. 2, a plurality of sensors C1, C2, C3 . . . Cn which are on board the vehicle and which make it possible to measure variables which can intervene in the operation dynamics of the vehicle and to estimate, through calculation, other variables that are not directly measured.

In a non-limitative manner, the sensors used can include a sensor of the longitudinal acceleration or deceleration of the vehicle, sensors of the displacement of the wheels 3, 10 with respect to the body of the vehicle and which can be constituted by those designed for the correction of the pitch of this vehicle, sensors of the rotation speed of the wheels, wherein one sensor per wheel can be provided, and which provide a square signal whose frequency is proportional to the rotation speed of the wheel, a sensor of the pressure of the master cylinder in pair, an inclinometer for measuring the slope on which the vehicle is moving, a sensor of the moving speed of the vehicle, and others.

The various sensors C1 to Cn are connected via a multiplexed bus CAN to a circuit 14 for adapting the exit signals of these sensors which can include in particular means for filtering the signals.

The adaptation circuit 14 is connected to a piloting device 15 to which the various information coming from the various sensors C1 to Cn, and, when appropriate, the information representative of the state of the acceleration pedal and brake pedal of the vehicle, is transmitted, so as to determine from this information the state of the vehicle and to calculate braking orders which are transmitted to the dynamic braking device 6 and to the static braking device 7 so as to ensure in particular the immobilization of the vehicle as soon as its speed is zero, to restart the vehicle after it has stopped, to trigger a controlled deceleration of the vehicle, and/or to ensure a secure braking of the vehicle when it is stopped.

The piloting device 15 comprises a supervision module 16 with an electronic block 17 whose functions are in particular to evaluate from sensors C1 to Cn the dynamic situation in which the vehicle is placed, i.e., whether it is moving on level ground, uphill or downhill, going forward or in reverse, to estimate the speed of the vehicle with precision thanks to the sensors of the rotation speed of the wheels of this vehicle, in particular at low speeds, as will be seen below, and/or to estimate the slope on which the vehicle is moving in a manner which will be described below.

The piloting device 15 also comprises a controller 18 whose role is to determine the state of the vehicle from the information coming from the block 17 or from the information coming from the sensors C1 to Cn via the adaptation circuit 14, and a calculator block 20 calculating braking orders which are transmitted to the piloted or dynamic braking device 6 and to the static braking device 7.

The dynamic braking device 6 makes it possible to generate a braking pressure wheel by wheel of the vehicle so that the braking operation of the vehicle can be applied only to the front or rear axles or simultaneously on both axles. The sensor of longitudinal acceleration can be integrated directly into the block of the dynamic braking device 6 and in which are also located a sensor of lateral acceleration and a sensor of yawing movement of the vehicle.

The invention is interested more particularly in the control of the operation of a vehicle moving on a slope.

Generally, when a vehicle is moving on a relatively steep slope, for example, more than 20%, the piloting device 15 is programmed so as to immobilize the vehicle and to maintain it in a stopped state as soon as its speed is zero by calculating braking orders that make it possible to actuate simultaneously the dynamic braking device 6 and the static braking device 7. This situation is reflected on FIGS. 3A and 3B where FIG. 3A shows the actuation of the acceleration pedal PA as a function of time, the release of this pedal occurring at time T1 at which the engine torque CM decreases in a corresponding manner as indicated by curve CM on FIG. 3B. As soon as the acceleration pedal 2 is released, the speed of the vehicle symbolized by the curve V decreases to become zero at time T2, the piloting device 15 pilots the dynamic braking device 6 by sending it a braking pressure order defined by the curve CPS on FIG. 3B, and, at the same time, pilots the static braking device 7 according to the braking order represented by the curve FSE in dotted line on FIG. 3B, so as to immobilize in this manner, as soon as time T2, the vehicle on a steep slope in order to obtain a powerful braking effort making it possible to maintain the vehicle.

In the case of a relatively gentle slope, for example, of less than 3%, the piloting device 15 can also be programmed to immobilize the vehicle as soon as its speed is zero by braking the latter by actuating only the static braking device 7, the braking order transmitted by the controller 20 to the device 7 having the appearance of the curve FSE on FIG. 3B.

During a request for acceleration of the vehicle when the driver pushes on the acceleration pedal 2 when the vehicle is immobilized on a steep slope, the piloting device 15 deactivates the static braking device 7 and controls a release operation of the vehicle by deactivating progressively the dynamic braking device 6 to enable the vehicle to start again.

Advantageously, the braking pressure order CPF transmitted by the controller 20 of the piloting device 15 to the dynamic braking device 6 is optimized so as to take into account, on the one hand, the slope on which the vehicle is moving in order to apply the braking pressure just required increased by a multiplicative security factor, and, on the other hand, the global braking effectiveness in order to take into account the variations of the mass of the vehicle and the variations of the friction coefficient of the brake pads which is dependent on the temperature of the brakes, the wear of the brake pads, the hygrometry degree, etc.

The global effectiveness of the braking of the vehicle is determined very simply by the deceleration of the vehicle for a given braking pressure; it is thus determined when the driver brakes in a completely transparent manner and, as a consequence, transmitted to the piloting device 15. This global effectiveness of the braking can be re-initialized to a value that is voluntarily high, corresponding to critical braking situations in connection with a low friction coefficient of the brake pads caused, for example, by a high degree of wear thereof or by an abnormally high temperature of the brakes and such a re-initialization can be performed at the time of an evolution of the mass of the vehicle which, for example, translates into the presence of a trailer attached at the rear of the vehicle or of a charge fixed to the roof of the vehicle and detected when the engine of the vehicle is started.

FIG. 7 shows the optimized appearance of a braking pressure order CPF applied by the piloting device 15 to the dynamic braking device 6 as a function of the slope on which the vehicle is moving and of the global braking effectiveness. This curve shows that at the time T2, the pressure climbs rapidly to a value P1 located above a zone Z in which braking noises can occur located between the braking pressures P2 and P3 where P3 corresponds to the braking pressure just required to maintain the vehicle in a stopped state and P2 corresponds to half the pressure P3. The optimized curve evolves subsequently more slowly to reach a target braking pressure value P4 which takes into account the slope and the global braking effectiveness and which can be calculated so as to correspond, for example, to twice the pressure P3. FIG. 7 shows that, for example, after a takeover by the static braking device 6 to maintain the vehicle in a stopped state, the pressure P4 falls rapidly below the noise zone Z, then decreases more slowly until the value of the pressure is zero in order to smooth the variation of the pitch of the vehicle caused by the transition of the braking from the four wheels of the vehicle by the dynamic braking device to the two rear wheels of the vehicle by the static braking device 6.

It will be noted also that the braking pressure conform to the curve on FIG. 7 is applied by the dynamic braking device 6 to the four wheels of the vehicle, even if the static braking device 6 takes over subsequently to actuate the rear brakes of the vehicle, which makes it possible to strongly limit the movements of the body of the vehicle during the stopping phase of the vehicle.

FIGS. 4A and 4B show two chronograms during a stop of a vehicle moving on a uphill slope with sufficient braking applied by the driver on the brake pedal. FIG. 4A thus reflects the situation in which the driver has released at time TI the acceleration pedal 2 (curve PA), then at time T2 has applied until time T3 a braking pressure on the brake pedal of the vehicle (curve PE). The curve CM of FIG. 4B is relative to the engine torque evolving according to the release of the acceleration pedal 2 and the curve V concerns the moving speed of the vehicle which becomes zero at time T4 before the driver has released the brake pedal at the time T5 at which the dynamic braking device has taken over to maintain the vehicle in a stopped state according to the curve CPF whose pressure drop is conform to that on FIG. 7 once the static braking device 7 will have taken over to maintain the vehicle in a stopped state as indicated by the curve FSE.

FIGS. 5A and 5B show two chronograms of the stopped state of the vehicle moving on an uphill slope with insufficient braking applied by the driver to the brake pedal of the vehicle.

FIG. 5A is identical to FIG. 4A except that the braking pressure PE applied by the driver on the brake pedal is lower than that on FIG. 4A. FIG. 5B shows that when the moving speed of the vehicle is zero at time T4 while the driver applies the insufficient braking pressure, the piloting device 15 transmits to the dynamic braking device 6 the braking order CPF whose pressure, determined according to the slope and the global braking effectiveness, is higher than the braking pressure applied by the driver so as to maintain the vehicle in a stopped state without letting it back up. Subsequently, the appearances of the curves CPF and FSE are identical to those described in reference to FIG. 4B.

In conditions of extremely heavy charges of the vehicle, the driver of the vehicle can inform the piloting device 15 of this situation so that the latter can apply to the vehicle a higher braking pressure. For example, the driver can apply a pressure on the control switch of the static braking device 7 for a determined duration, for example, at least three seconds. The piloting device can take into account this information from the driver to control the switching on of a pilot lamp on the dashboard of the vehicle and, in any case, to control the dynamic and static braking devices so that they apply the braking pressure taking into account the heavy charge of the vehicle.

The piloting device 15 can know the braking effort applied by the cable or cables 12 of the static braking device 7 to then adapt this effort, for example, according to the slope on which the vehicle is moving. This effort can be measured in a classic manner by a sensor of the tension of the cable, for example, of the potentiometer type, whose resistance variations correspond to the variations in the tension of the cable, of the Hall effect and magnet type, or of the type with a switch having several positions corresponding to various levels of the clamping tension of the cable 12. Preferably, according to the invention, the braking effort applied to the cable or cables 12 of the static braking device 7 is estimated from the intensity of the control current of the electric motor of this device, an economical solution since it does not use a sensor. Thus, the piloting device 15 can calculate the clamping effort in the cable or cables 12 by determining the torque at the exit of the electric motor from the intensity of the electric current of the motor and from the output, which is known, of the reducer associated to the electric motor.

This piloting device 15 can also be programmed so as to ensure an emergency braking mode when the dynamic braking device is out of service. To this effect, the piloting device 15 actuates the static braking device 7 when the driver actuates the control switch of this device and pushes simultaneously on the brake pedal of the vehicle, so that the hydraulic braking pressure is established by the driver in place of the dynamic braking device 6.

The piloting device 15 can be programmed to elaborate a strategy called dead center or neutral position. More precisely, when the vehicle stops while the gear selecting lever is in dead center or neutral position according to the type of the gear box, no braking order from the piloting device will be executed. Conversely, if the selecting lever is positioned in its dead center or neutral position while the vehicle was already being maintained in a stopped position by the dynamic braking device and/or the static braking device, this maintaining action is kept on.

The piloting device 15 is also adapted to determine the slope on which the vehicle is moving by calculating the difference between the value of the longitudinal deceleration provided by the sensor of longitudinal deceleration and the value of the longitudinal deceleration calculated by the device 15 from the sensors of the rotation speed of the wheels of the vehicle, this calculated value of the longitudinal deceleration being independent from the slope, so as to deduct a shift value of the longitudinal deceleration $\gamma_{longislope}$:

$$\gamma longislope = \gamma longisensor - \gamma longiwheels.$$

From this shift value of the longitudinal deceleration, the piloting device 15 can then calculate the slope according to the formula:

$$slope [\%] = 100 \times \tan\left\{\arcsin\left(\frac{\gamma longislope}{g}\right)\right\}$$

Insofar as the sensor of longitudinal acceleration present on the vehicle is sensitive to variations of the pitch of this vehicle, it is advisable, when the sensors of the displacement of the wheels with respect to the body of the vehicle are present, to correct the signal provided by the sensor of longitudinal acceleration as a function of the pitch of the vehicle and according to the formula:

$$\gamma longisenscorr = \gamma longisensor - \sin\left(\arctan\left(\frac{Zfr - Zre}{a}\right)\right)$$

where $Z_{fr}$: displacement of the front wheels with respect to the body;

$Z_{re}$: displacement of the rear wheels with respect to the body;

a: wheel base of the vehicle.

Further, the piloting device 15 makes it possible to analyze the evolution of the calculated slope to verify its coherence with the distance covered by the vehicle in order to avoid taking into account for the immobilization of the vehicle a small distance covered by the latter for a calculated slope gap, which could be the case, for example, when the vehicle climbs on a sidewalk as shown on FIG. 8. To this effect, in the case of the vehicle climbing on the sidewalk, the piloting device 15 calculates a slope gap according to the formula:

$$\Delta slope = \text{Arccos}\left(\frac{b - \Delta b}{a}\right) - \text{Arccos}\left(\frac{b}{a}\right)$$

where a is the wheel base of the vehicle, the radius of the wheels being neglected, and b is the distance covered by the vehicle.

The piloting device 15, during the deceleration of the vehicle, calculates a value of the longitudinal deceleration $\gamma$ $_{longiwheels}$ from each of the sensors of the speed of the wheels of the vehicle according to the formula:

$$\gamma longiwheels = 2\frac{2\pi R}{N} \times \frac{\frac{1}{Tn} - \frac{1}{Tn-1}}{Tn + Tn - 1}$$

where R is the rolling radius of the wheel;

N is the number of tops per revolution of the speed sensor; and

Tn, Tn−1, ... are the present and past periods, respectively, defined at each upward front of the period of the square signal provided by the speed sensor and which is inversely proportional to the rotation speed of the wheel.

Then, the piloting device 15 calculates an average value of the longitudinal deceleration for the four wheels.

Finally, the piloting device 15 is adapted to calculate the moving speed of the vehicle as schematized on FIG. 6. In fact, this involves determining the rotation speed of a wheel from the period of the signal originated in the sensor of the speed of the wheels of the vehicle, and, at very low speeds, lower than 0.5 m/s, the resolution of the sensor is too low to make it possible to update the speed only at each upward front of the periodic signal. The longitudinal deceleration $\gamma_{longiwheels}$ calculated over the two previous crenelations is then used to make the speed evolve in a continuous manner between these two crenelations.

The calculation of the speed of the vehicle is then obtained according to the formula:

$$V(t) = \frac{2\pi R}{NTn} \times \gamma longiwheels \frac{Tn + t}{2}$$

where t represents the time passed since the last upward front of the signal.

The speed of the vehicle kept by the piloting device 15 is then the average of the four calculated values of the speed of the vehicle by individual filtering through a low-pass filter having a cutoff frequency of about 10 Hz.

The piloting device 15 can be constituted by several electronic calculators dedicated to the various functions defined in the preceding description. For example, this can involve a piloting architecture of the type having a master calculator piloting and coordinating the actions of each of the slave calculators containing the algorithms for controlling the dynamic and static braking devices.

The system of the invention does not require any training on the part of the driver. Further, it ensures a stopped state without backing up on an uphill slope whatever the braking pressure applied by the driver and whatever the slope.

The invention claimed is:

1. System for controlling the state and operation of a motor vehicle equipped with a dynamic braking device and a static braking device, comprising
    a plurality of sensors (C1, ... Cn) on board the vehicle, including a sensor of the longitudinal deceleration of the vehicle, at least one sensor of the rotation speed of one of the wheels of the vehicle, a sensor of the displacement of the wheels of the vehicle with respect to the body of the vehicle, and a sensor of the pressure of the master cylinder, and
    a piloting device receiving information from the plurality of sensors and determining from said information and from information representative of the states of the brake and acceleration pedals of the vehicle, the state of the vehicle and calculating braking orders transmitted to the dynamic and static braking devices,
    wherein the system performs the following actions: (i) to maintain the vehicle immobilized as soon as the speed of the vehicle is zero, (ii) to restart the vehicle after it has stopped, (iii) to trigger a controlled deceleration of the vehicle, and (iv) to ensure a secure braking of the vehicle in a stopped state of the vehicle,
    wherein the piloting device determines the slope on which the vehicle is moving by calculating the difference between the value of the longitudinal deceleration of the vehicle provided by the sensor of the longitudinal deceleration and the value of the longitudinal deceleration calculated from the sensor of the rotation speed of a wheel of the vehicle to determine a shift value of the longitudinal deceleration $\gamma_{longislope}$ and by calculating the slope according to the formula:

$$\text{slope}[\%] = 100 \times \tan\left\{\arcsin\left(\frac{\gamma longislope}{g}\right)\right\}$$

wherein g is the acceleration of gravity.

2. System according to claim 1, wherein the piloting device immobilizes the vehicle as soon as the speed of the vehicle is zero by braking the vehicle through the simultaneous actuation of the dynamic braking device of the vehicle and of the static braking device of the vehicle when the vehicle is located on a relatively steep slope.

3. System according to claim 2, wherein the piloting device immobilizes the vehicle as soon as the speed of the vehicle is zero by braking the vehicle through the simultaneous actuation of the dynamic braking device of the vehicle and of the static braking device of the vehicle when the vehicle is located on a slope of at least 20%.

4. System according to claim 1, wherein the piloting device immobilizes the vehicle as soon as the speed of the vehicle is zero by braking the vehicle through the actuation of the static braking device of the vehicle when the vehicle is located on a relatively gentle slope.

5. System according to claim 4, wherein the piloting device immobilizes the vehicle as soon as the speed of the vehicle is zero by braking the vehicle through the actuation of the static braking device of the vehicle when the vehicle is located on a slope of less than 3%.

6. System according to claim 1, wherein the piloting device analyzes the evolution of the calculated slope to verify the coherence of the calculated slope with the distance covered by the vehicle without taking into account for the immobilization of the vehicle a small distance covered by the vehicle for a calculated slope gap, by using the following formula:

$$\Delta\text{slope} = \text{Arccos}\left(\frac{b - \Delta b}{a}\right) - \text{Arccos}\left(\frac{b}{a}\right)$$

where a is the wheel base of the vehicle and b is the distance covered by the vehicle.

7. System according to claim 1, wherein the piloting device calculates a correction of the value of the longitudinal deceleration provided by the sensor of the longitudinal deceleration of the vehicle from sensors of the displacement of the front and rear wheels with respect to the body of the vehicle according to the formula:

$$\gamma longisenscorr = \gamma longisensor - \sin\left(\arctan\left(\frac{Zfr - Zre}{a}\right)\right)$$

where γlongisensor is the value of the longitudinal deceleration provided by the sensor of the longitudinal deceleration of the vehicle, $Z_{fr}$ is the displacement of the front wheels, $Z_{re}$ is the displacement of the rear wheels, and a is the wheel base of the vehicle.

8. System according to claim 1, wherein the piloting device calculates an optimized braking pressure order applied to the dynamic braking device as a function of the slope on which the vehicle is moving and of an estimation of the global braking effectiveness of the vehicle determined by the longitudinal deceleration of the vehicle for a given braking pressure resulting from pushing on the brake pedal by the driver of the vehicle during the braking operations of the vehicle.

9. System according to claim 8, wherein the piloting device optimizes the braking pressure order to a value just required for maintaining the vehicle in a stopped state increased by a multiplying security factor, wherein the braking pressure applied to the dynamic braking device is above a zone of braking noises.

10. System according to claim 9, wherein the dynamic braking system is activated by the piloting device and applies the braking order to the four wheels of the vehicle and when the dynamic braking device is deactivated, the braking pressure falls brutally under the zone of braking noises, then decreases more slowly to a zero value.

11. System according to claim 1, wherein the static braking device comprises an electric geared motor driving at least a cable for actuation of a parking brake acting on the rear wheels of the vehicle and the piloting device calculates the clamping effort in the cable by determining the torque at the exit of the electric motor from the intensity of the electric current of the motor and the output of the reducer of the motor.

12. System according to claim 1, wherein the piloting device actuates the static braking device when the driver actuates a control button of the static braking device and when the driver pushes simultaneously on the brake pedal to ensure an emergency mode when the dynamic braking device is out of service.

13. System according to claim 1,
wherein the piloting device maintains at least one of the dynamic and static braking devices activated when the driver brings a selecting lever of the gear box into the dead center or neutral position when the vehicle is already stopped,
and the piloting device does not activate any of the dynamic and static braking devices when the vehicle stops with the selecting lever already in the dead center or neutral position.

14. System according to claim 1, wherein the piloting device applies to at least one of the dynamic braking device and the static braking device a higher braking pressure order in case of overloading of the vehicle signaled to the piloting device by a manual action of the driver.

15. System according to claim 14, wherein the manual action of the driver is by pushing for a determined duration on a control switch of the static braking device.

16. System for controlling the state and operation of a motor vehicle equipped with a dynamic braking device and a static braking device, comprising
a plurality of sensors (C1, . . . Cn) on board the vehicle, including a sensor of the longitudinal deceleration of the vehicle, at least one sensor of the rotation speed of one of the wheels of the vehicle, a sensor of the displacement of the wheels of the vehicle with respect to the body of the vehicle, and a sensor of the pressure of the master cylinder, and
a piloting device receiving information from the plurality of sensors and determining from said information and from information representative of the states of the brake and acceleration pedals of the vehicle, the state of the vehicle and calculating braking orders transmitted to the dynamic and static braking devices,
wherein the system performs the following actions: (i) to maintain the vehicle immobilized as soon as the speed of the vehicle is zero, (ii) to restart the vehicle after it has stopped, (iii) to trigger a controlled deceleration of the vehicle, and (iv) to ensure a secure braking of the vehicle in a stopped state of the vehicle,
wherein, during a deceleration of the vehicle, the piloting device calculates a deceleration value from each of the sensors of the rotation speed of the wheels of the vehicle according to the formula:

$$\gamma longiwheels = 2\frac{2\pi R}{N} \times \frac{\frac{1}{Tn} - \frac{1}{Tn-1}}{Tn + Tn - 1}$$

where R: rolling radius of the wheel

N: number of tops per revolution of the wheel rotation speed sensor

Tn, Tn−1: present and past periods of the square signal provided by the wheel rotation speed sensor inversely proportional to rotation speed of wheel, the piloting device performing an average of the four calculated values of the longitudinal decelerations for the four wheels and calculating a speed of the vehicle for each wheel from each calculated value of the deceleration according to the formula:

$$V(t) = \frac{2\pi R}{NTn} \times \gamma longiwheels \frac{Tn + t}{2}$$

where t: time passed since the last upward front of the square signal of the wheel rotation speed sensor, and the piloting device calculates the speed of the vehicle by performing an average of the four calculated values of the speed of the vehicle for each wheel.

* * * * *